US009443426B1

(12) United States Patent
Formwalt (10) Patent No.: US 9,443,426 B1
(45) Date of Patent: Sep. 13, 2016

(54) METHOD AND DEVICE FOR SENSING TRAFFIC FLOW AND NOTIFYING MOTOR VEHICLE DRIVERS OF THE SAME

(71) Applicant: Byron Paul Formwalt, Syracuse, UT (US)

(72) Inventor: Byron Paul Formwalt, Syracuse, UT (US)

( * ) Notice: Subject to any disclaimer, the term of this patent is extended or adjusted under 35 U.S.C. 154(b) by 0 days.

(21) Appl. No.: 14/941,413

(22) Filed: Nov. 13, 2015

(51) Int. Cl.
| | | |
|---|---|---|
| H04N 7/18 | (2006.01) | |
| G08G 1/04 | (2006.01) | |
| B60R 1/00 | (2006.01) | |
| G08G 1/0962 | (2006.01) | |

(52) U.S. Cl.
CPC . G08G 1/04 (2013.01); B60R 1/00 (2013.01); G08G 1/0962 (2013.01); H04N 7/18 (2013.01); *B60R 2300/10* (2013.01); *B60R 2300/80* (2013.01)

(58) Field of Classification Search
CPC .......... G08G 1/166; G08G 1/096783; G08G 1/096725; B60Q 9/008; G01S 13/931; H04N 7/18; B60W 50/14; B60W 50/08
See application file for complete search history.

(56) References Cited

U.S. PATENT DOCUMENTS

| | | | |
|---|---|---|---|
| 8,380,426 B2 | 2/2013 | Konijnendijk | |
| 8,392,115 B2 | 3/2013 | Kataoka et al. | |
| 8,412,448 B2 | 4/2013 | Lee et al. | |
| 8,447,437 B2 | 5/2013 | Chiang | |
| 8,452,055 B2 | 5/2013 | Stein et al. | |
| 8,493,196 B2 | 7/2013 | Pandy | |
| 8,744,661 B2 | 6/2014 | Horn | |
| 8,775,063 B2 | 7/2014 | Zeng | |
| 8,788,136 B2 | 7/2014 | Rentschler et al. | |
| 8,798,867 B2 | 8/2014 | Stoll et al. | |
| 8,798,907 B2 | 8/2014 | Shida | |
| 8,841,994 B2 | 9/2014 | Li et al. | |
| 8,849,508 B2 | 9/2014 | Ibrahim et al. | |
| 8,862,380 B2 | 10/2014 | Jung | |
| 8,924,140 B2 | 12/2014 | Sakamoto et al. | |
| 8,948,449 B2 | 2/2015 | Zhang et al. | |
| 8,983,706 B2 | 3/2015 | Hartmann et al. | |
| 8,983,725 B2 | 3/2015 | Breu | |
| 9,031,774 B2 | 5/2015 | Suk et al. | |
| 2004/0158366 A1* | 8/2004 | Dieterle | B60K 31/0008 701/23 |
| 2014/0111646 A1* | 4/2014 | Hamilton, Sr. | B60R 1/00 348/148 |
| 2015/0061895 A1* | 3/2015 | Ricci | H04W 4/22 340/902 |
| 2015/0099495 A1* | 4/2015 | Crosbie | B60W 50/14 455/414.3 |
| 2015/0332590 A1* | 11/2015 | Salomonsson | G08G 1/167 701/28 |

* cited by examiner

*Primary Examiner* — Neil Mikeska (57) ABSTRACT

A method and device for providing wireless notifications to a driver via a mobile device indicating when a stopped traffic condition in the present lane of travel is about to resume flowing.

4 Claims, 5 Drawing Sheets

| | Description of Input Case | 405 | 407 | 408 | 409 | 410 | 412 | 413 | 415 | 417 | 418 | Description of Result |
|---|---|---|---|---|---|---|---|---|---|---|---|---|
| 501 | The vehicle is moving in traffic. | Yes | Yes | Yes | - | - | - | - | - | - | - | Traffic monitoring continues. The external traffic monitoring state is reset. |
| 502 | The vehicle was stopped behind a stationary object,(e.g. another vehicle), and the object is in the same position as in the last frame. | Yes | Yes | No | Yes | Yes | - | - | - | - | - | Traffic monitoring continues, and the object persistence counter is incremented. |
| 503 | The vehicle was stopped behind a stationary object,(e.g. another vehicle), but the object has moved to a new position. | Yes | Yes | No | Yes | No | - | Yes | - | - | - | The wirelessly paired mobile device will be sent a notification that traffic in this lane should resume. The state is reset. |
| 504 | The vehicle is stopped behind a moving object that was also moving in the previous frame. No traffic light is in view. | Yes | Yes | No | Yes | No | - | No | - | - | Yes | Traffic monitoring continues and the external traffic monitoring state is reset. |
| 505 | The vehicle is stopped behind a moving object that was also moving in the previous frame. A traffic light is in view. | Yes | Yes | No | Yes | No | - | No | - | - | No | Traffic monitoring continues and the object persistence counter is reset. |
| 506 | The vehicle was stopped behind a stationary object,(e.g. another vehicle), but the object is no longer in view in the current frame. | Yes | Yes | No | No | - | Yes | - | - | - | - | The wirelessly paired mobile device will be sent a notification that traffic in this lane should resume. The state is reset. |
| 507 | The vehicle is stopped at a traffic light that has just made the transition to a green light. | Yes | Yes | No | No | - | No | - | Yes | Yes | - | The wirelessly paired mobile device will be sent a notification that traffic in this lane should resume. The state is reset. |
| 508 | The vehicle is stopped at a traffic light. The traffic signal may be any color, but did not just transition to green. | Yes | Yes | No | No | - | No | - | Yes | No | - | The process will continue monitoring until the light transitions to green. |
| 509 | The vehicle has come to a complete stop at a location not behind another vehicle and with no traffic lights visible. | Yes | Yes | No | No | - | No | - | No | - | - | Traffic monitoring continues without modification to the state of external traffic conditions. |
| 510 | The circular image frame buffer is not yet fully populated such as when the process first begins to run. | Yes | No | - | - | - | - | - | - | - | - | Frames continue to accumulate in the circular image frame buffer until the buffer is full. |
| 511 | Camera is obscured by precipitation or windshield wiper(s). | No | - | - | - | - | - | - | - | - | - | Frame is discarded and processing resumes as if it never was acquired. |

US 9,443,426 B1

METHOD AND DEVICE FOR SENSING TRAFFIC FLOW AND NOTIFYING MOTOR VEHICLE DRIVERS OF THE SAME

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING ON COMPACT DISC OR IN APPENDIX

Not Applicable.

BACKGROUND OF THE INVENTION

The present invention is in the technical field of autonomous operation of a motor vehicle. More particularly, the present invention is in the technical field of advanced driver assistance systems (ADAS). More particularly, the present invention is in the field of automatic interpretation of traffic signals and flow.

Currently on the market there are self-driving vehicles. Currently on the market there are also ADAS devices that serve to record traffic events. Additionally, there are also ADAS devices capable of detecting lane departure, such as disclosed in U.S. Pat. No. 8,983,725; U.S. Pat. No. 8,849,508; U.S. Pat. No. 8,788,136; U.S. Pat. No. 8,775,063; U.S. Pat. No. 8,392,115; U.S. Pat. No. 8,798,867; and U.S. Pat. No. 8,798,907. There are other ADAS inventions that serve to alert the operator of a motor vehicle of an imminent collision, such as disclosed in U.S. Pat. No. 9,031,774; U.S. Pat. No. 8,924,140; U.S. Pat. No. 8,862,380; U.S. Pat. No. 8,841,994; U.S. Pat. No. 8,744,661; U.S. Pat. No. 8,493,196; U.S. Pat. No. 8,452,055; U.S. Pat. No. 8,423,280; U.S. Pat. No. 8,412,448; U.S. Pat. No. 8,380,426; U.S. Pat. App. 2014/0278048; U.S. Pat. App. 2014/0037138; U.S. Pat. App. 2013/0158852; and U.S. Pat. App. 2013/0090806. Additionally, U.S. Pat. No. 8,948,449 discloses an invention for clear path detection without regard to traffic signals. U.S. Pat. No. 8,983,706 discloses prior art for guiding maneuvers of a motor vehicle operator based on the environment surrounding a vehicle, but that invention depends on the assumption that the motor vehicle is being actively driven in traffic. U.S. Pat. No. 8,798,867 discloses an invention for pedestrian protection aiding a driver in detecting and avoiding pedestrians in traffic. U.S. Pat. No. 8,798,907 and corresponding U.S. Pat. App. 2013/0030687 disclose an invention to detect the relative position of a preceding vehicles but claims to do so dependent on a system of inter-vehicular communication. Finally, U.S. Pat. No. 8,447,437 discloses an ADAS system for automatic driving and parking requiring an array of camera sensors, depends on an image recognition library, and has dependent claims for driver notification via computer or mobile phone specifically for the purpose of controlling a motor vehicle in motion.

BRIEF SUMMARY OF THE INVENTION

The present invention is a method and device for providing wireless notifications to a driver via a mobile device indicating when a stopped traffic condition in the present lane of travel is about to resume flowing. Common examples include stopped traffic at red lights or freeway traffic jams. In the latter case, traffic might be stopped for tens of minutes at a time, while the former case usually leads to controlled stops for two minutes or less at a time. This the present invention enables motor vehicle operators to safely divert their attention from traffic until such a time when they can legally resume operation of their vehicles. The device combines prior art in image processing in a new utilitarian way to determine from a single passive camera sensor when the vehicle is stopped in traffic under conditions that do not permit forward motion. Once traffic conditions have changed to allow traffic flow to resume, the device visually and/or audibly notifies the driver to pay attention to traffic conditions.

BRIEF DESCRIPTION OF THE DRAWINGS

FIG. 5 is a truth table summarizing every possible path that can be traced through the flow diagram in FIG. 4.

DETAILED DESCRIPTION OF THE INVENTION

Figure 1:
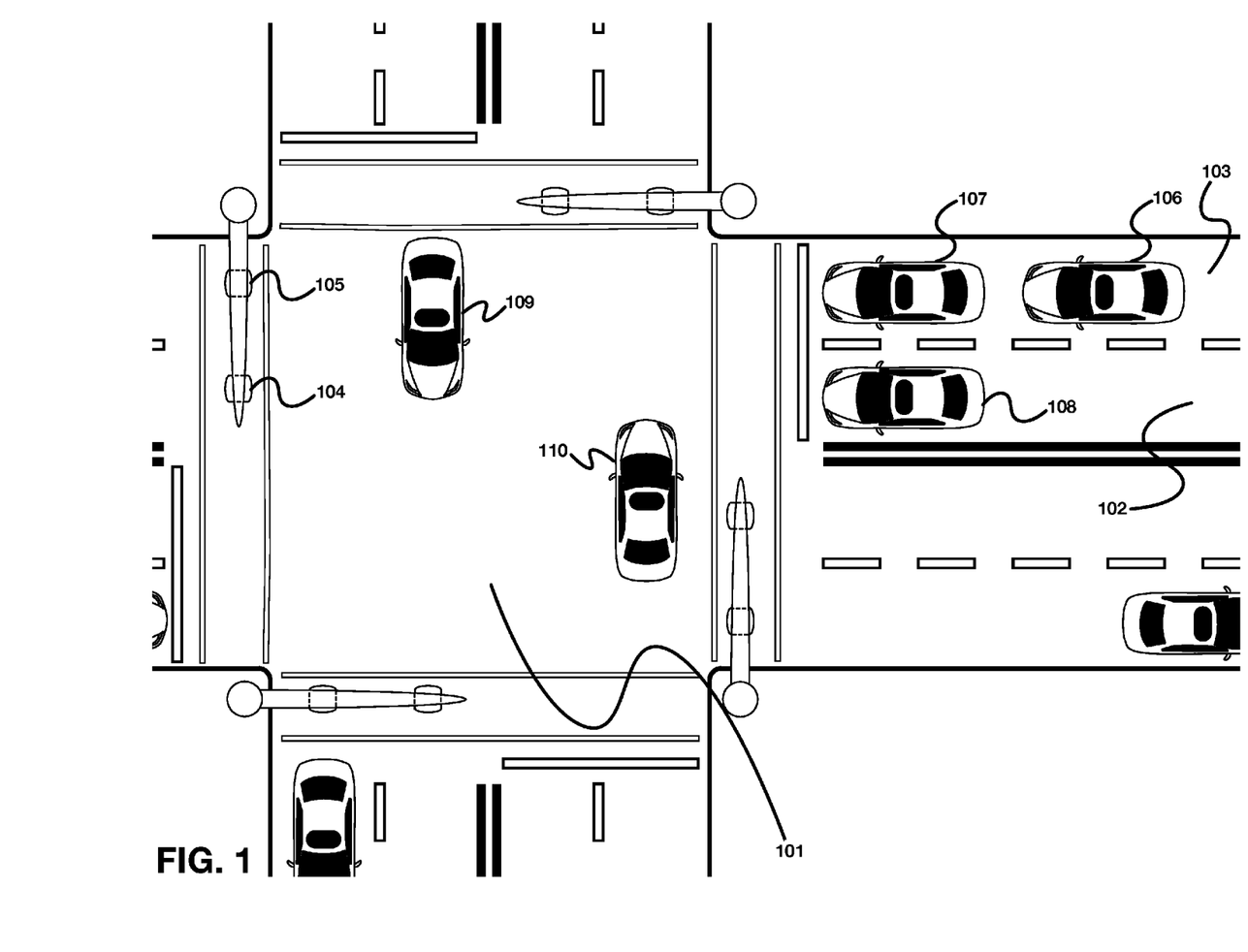
FIG. 1 is a top view of a typical traffic intersection controlled by illuminated traffic signals, also referred to as traffic lights.

Referring now to the drawings, wherein the depictions are for the purpose of illustrating certain exemplary embodiments only and not for the purpose of limiting the same, FIG. 1 depicts a typical traffic intersection 101. Traffic lanes 102 and 103 are presented with corresponding red traffic lights on illuminated traffic signals 104 and 105. An illuminated traffic signal is can also be referred to by labeling the color of the currently illuminated traffic light that the illuminated traffic signal comprises. For example, since there is a red traffic light illuminated in illuminated traffic signal 104, the term, illuminated red traffic signal 104, refers to signal 104 and also indicates that signal 104 is currently illuminating a red traffic light. Vehicles 106, 107, and 108 are all stopped in response to the state of the red traffic lights controlling their respective lanes. Vehicles 109 and 110 are traveling transversely through the intersection 101. While the intersection 101 features two parallel lanes of travel in four orthogonal directions, the present invention is intended to operate at all types of traffic conditions, including all types of traffic intersections.

FIG. 1 indicates two fundamental cases of a motor vehicle stopped in traffic. The first case applies to the vehicles 107 and 108 where the corresponding red traffic lights 105 and 104 are in full view of the operators of vehicles 107 and 108. Furthermore, in this first case, there are no stationary objects interposed between vehicles 107 and 108 and corresponding traffic signals 105 and 104. The second case pertains to vehicle 106 which is unable to move because it is stopped behind vehicle 107 which is also stopped. The fact that vehicle 107 is stopped at a traffic light is purely coincidental as it pertains to this second case. Other cases where a vehicle is stopped with no traffic light in view and no stationary object blocking its present lane of travel are not assisted by the present invention and hence are not depicted in FIG. 1.

Referring now to the operation of the invention as it pertains to FIG. 1, if 104 transitions from a red light to a green light, the present invention operating inside of 108 will send a wireless signal to the corresponding driver's handheld mobile communication device (DHMCD) indicating that traffic is about to resume flowing in lane 102. Similarly, if 105 transitions from a red light to a green light, the present invention operating inside of 107 will send a wireless signal to the corresponding DHMCD indicating that traffic is about to resume flowing in lane 103. Subsequently, once 107 begins moving, the present invention operating inside of 106 will send a wireless signal to the corresponding DHMCD indicating that traffic flow is resuming in lane 103.

Figure 2:
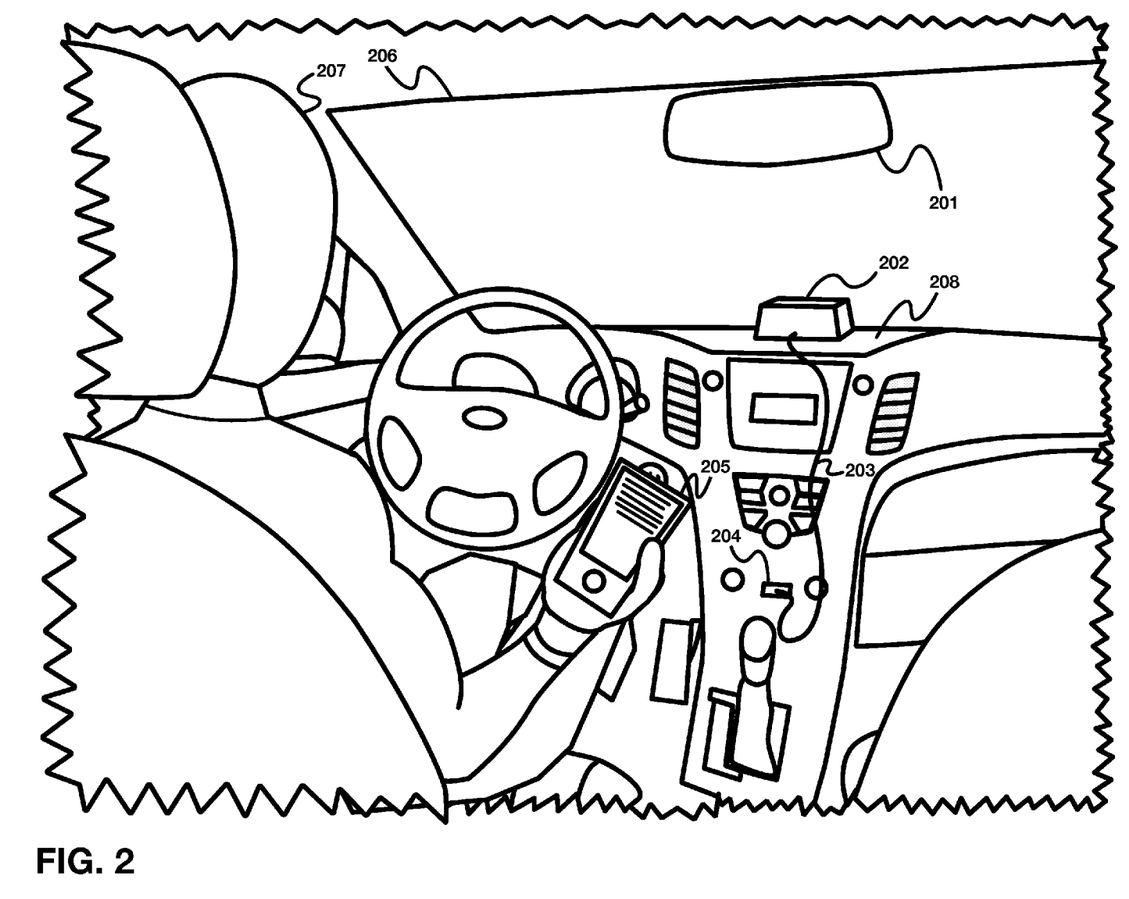
FIG. 2 is a perspective drawing of the present invention being used by a motor vehicle operator as viewed from the rear-right passenger seat.
Figure 3:
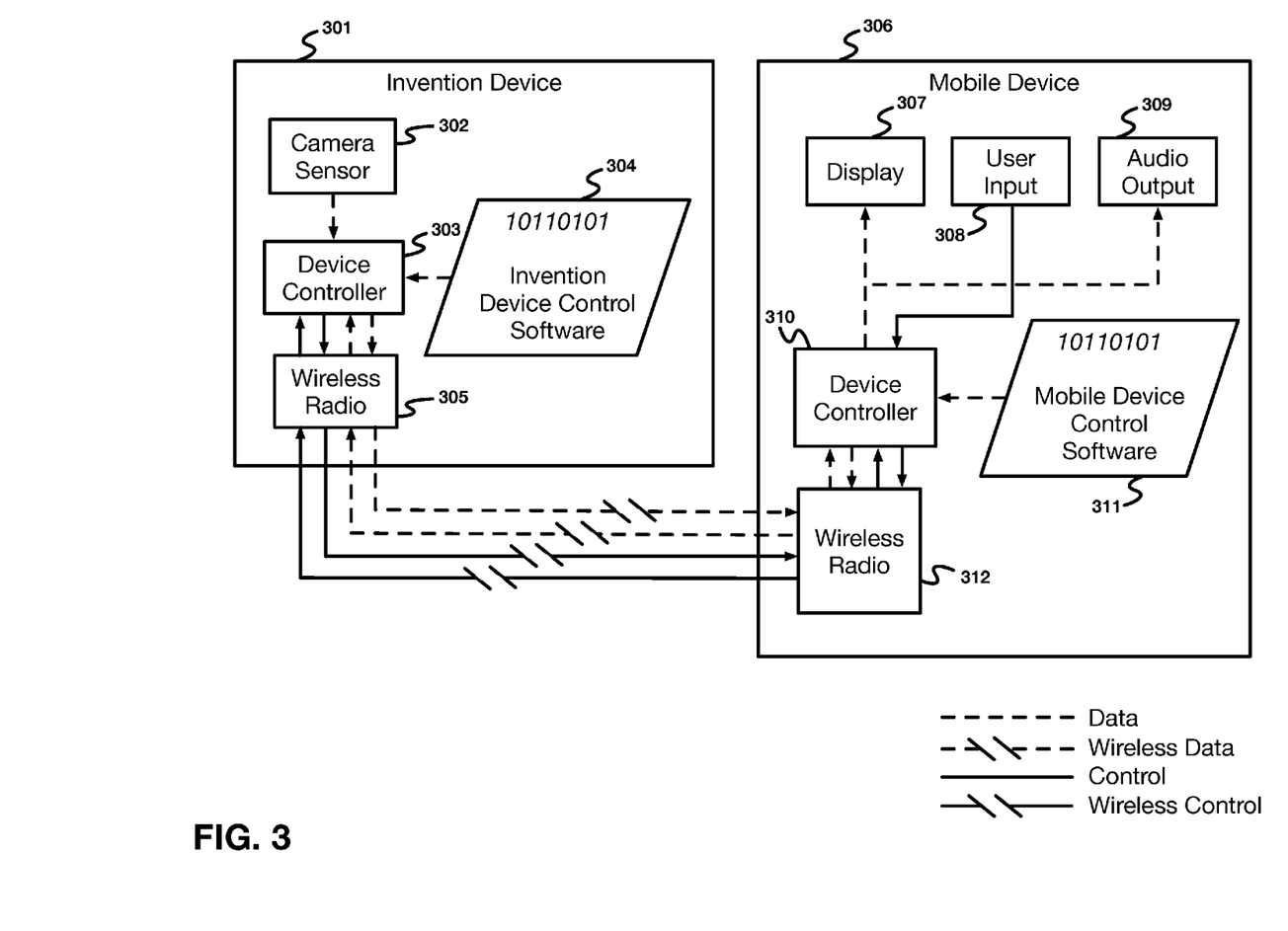
FIG. 3 is a functional block diagram of the present invention.

Referring now to the invention in FIG. 2, FIG. 3, FIG. 4, and FIG. 5 there is shown the present invention device 202 comprised of functional elements included in block 301. The device 202 described by block 301 in its preferred embodiment consists of a camera sensor 302, also referred to as the camera 302, with optical axis aligned with the direction of forward travel of the vehicle in which it is installed when the steering wheel is in the neutral position, and it is oriented about the optical axis so as to produce images that are representative of the scene viewed by the operator of the same motor vehicle when facing forward and viewing the road through a windshield 206. The preferred embodiment also consists of an invention device controller 303 which executes invention device control software (IDCS) 304 more specifically described by the flow diagram in FIG. 4 and yet more specifically described by the truth table of FIG. 5. The invention device controller 303 therefore contains the means to perform image processing tasks and in the preferred embodiment consists of four general purpose processing cores, 2 gigabytes of random access memory, and at least 8 graphics processing cores with each processing core operating with a clock speed of at least 1 gigahertz. The invention device controller 303 in its preferred embodiment also contains a universal serial bus host controller, power management functions, and an interface suitable for controlling and acquiring images from a camera module. The preferred embodiment also includes a wireless transceiver radio 305 also referred to as the wireless radio 305. Also depicted in FIG. 3 are relevant parts of a corresponding DHMCD 306, also referred to as the mobile device 306. FIG. 2 also depicts a physical representation of the DHMCD 205. The mobile device 306 communicates with the present invention through a wireless transceiver radio 312, also referred to as wireless radio 312. Mobile device 306 executes mobile device control software (MDCS) 311 as a means for wirelessly modifying the settings of the present invention, updating the IDCS 304, and issuing visual and audible alerts to the operator of the motor vehicle. The mobile device 306 also consists of a plurality of user input devices 308, one or more audio output devices 309, and one or more graphical displays 307. In the preferred embodiment, the primary display in 307 is physically integrated with a capacitive touch screen within 308.

Referring now to FIG. 2, there is a driver 207, also referred to as the motor vehicle operator 207. The vehicle may optionally include a rear view mirror 201 which may serve as an alternative mounting location for the invention device 202, but the preferred embodiment is mounted on the dash 208 as depicted in FIG. 2 because this configuration minimizes the complexity of routing and the length of the Universal Serial Bus (USB) power cable 203. This configuration saves cost while increasing portability, and decreasing installation complexity. The camera 302 contained within the invention device 202 continuously monitors traffic conditions from the perspective representative of that of the driver 207 by drawing electrical power through a USB outlet 204. The intent of the present invention 202 is to cue the driver 207 via the corresponding DHMCD 205 about any change in traffic conditions that may require the driver 207 to resume active operation of the vehicle. In cases where the driver 207 might normally and unsafely choose to remove focus from traffic conditions momentarily, so as to operate the corresponding DHMCD 205, the present invention will serve as a safety device and may prevent collisions in certain circumstances where latency in driver 207 behavior might otherwise encourage running a red light to avoid further delays in stopped traffic conditions.

Figure 4:
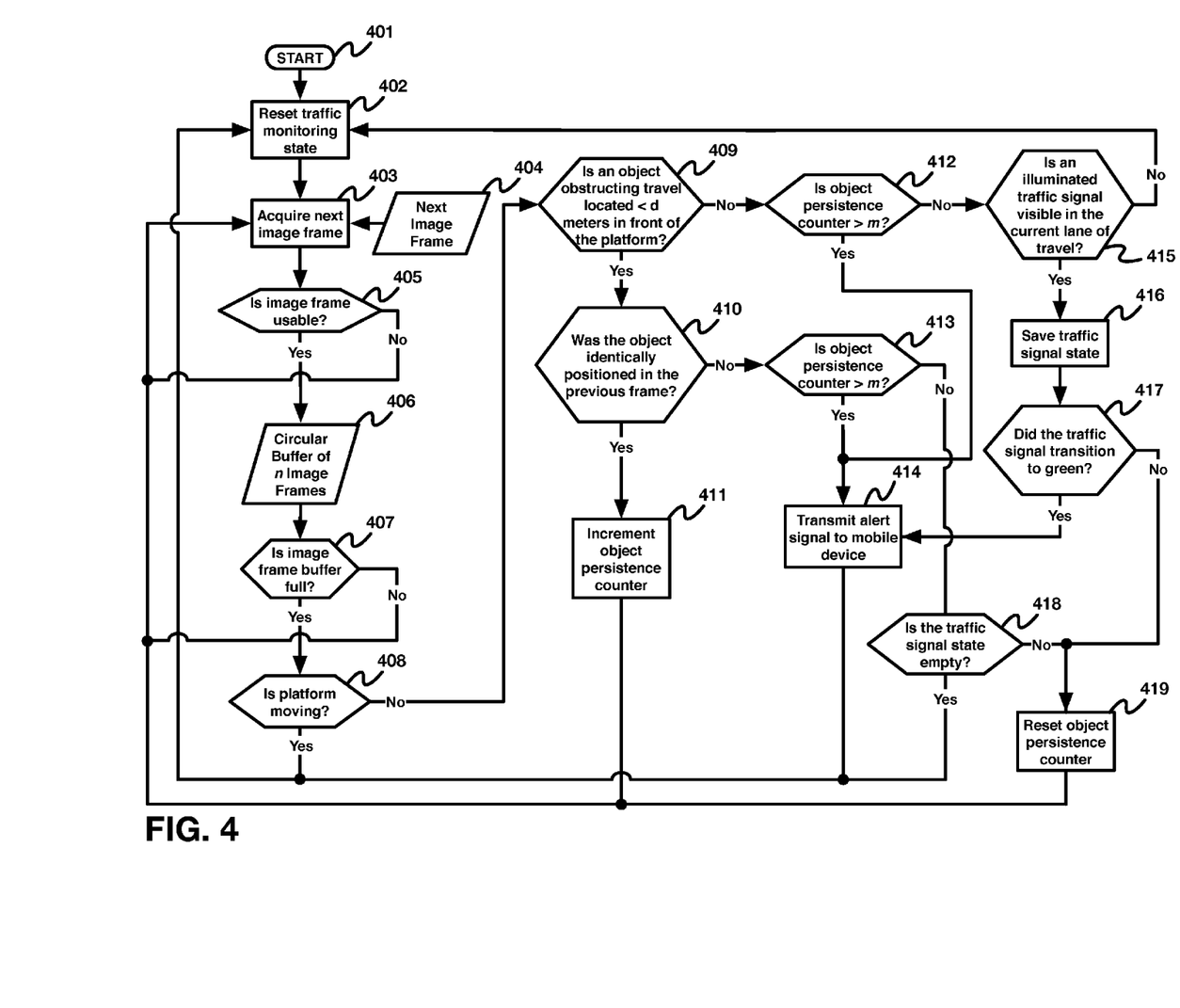
FIG. 4 is a flow diagram of the process employed by the present invention.

Referring now to FIG. 4, the IDCS 304 process from FIG. 3 is described as follows. The process begins executing at the start 401 when the system is first powered on. The first step of the process prior to entering the main event loop is to reset the traffic monitoring state in step 402. Step 403 marks the entry point of the main event loop. The only type of event that is processed by the main event loop of the present invention is in response to a newly acquired image frame represented by data element 404.

When an image frame 404 is acquired from the camera sensor 302, in step 403 flow control proceeds to step 405 which determines whether or not the image frame is usable. Usability in the preferred embodiment simply determines whether or not the image is partially or wholly obscured. This test can be conducted in a variety of ways as determined by someone with ordinary skill in the art. The preferred approach is a two-step approach, wherein the first step is to judge the similarity of a short series of sequential image frames, marking the last frame in the sequence as unusable if it is substantially different from the preceding frames. The second step is to test for the presence of a large dark obscuration that intersects two or more edges of the image frame and has a length greater than 150% of the longest edge of the image frame. The second step serves to detect obscurations such as those caused by a windshield wiper, while the first step detects frames where accumulated precipitation or debris is blocking the view of the camera sensor. In the preferred embodiment, image frames measure 640 pixels horizontally by 480 pixels vertically, with five image frames being acquired per second. The frame rate of the camera sensor is the quantity of image frames being acquired per second. For purposes of this specification, capturing an image frame is synonymous with acquiring an image frame. If the frame is determined to be unusable in step 405, then control is passed back to step 403.

Otherwise, control proceeds to store the image frame 404 into the next available slot in the image frame buffer 406. The image frame buffer 406 is circular, which a person with ordinary skill in the art will recognize as a recyclable buffer that enables a finite amount of memory in the invention device controller 303 to be used retaining the most recently acquired n usable image frames from step 403. In the preferred embodiment n=6. In step 407, the image frame buffer 406 is tested to determine whether or not every possible slot in the image frame buffer 406 contains a usable image frame. When the process in FIG. 4 is started, the image frame buffer 406 will be initially empty. If the image frame buffer 406 is not yet full, then control jumps back to step 403.

Otherwise, if the image frame buffer 406 is full, then control passes to step 408, wherein it is determined whether or not the vehicular platform on which the invention device 301 is installed is moving. In the preferred embodiment, this determination is made by analyzing edge detection images for each frame in the image frame buffer 406 to determine what fraction of edge pixels are common to all n image frames in the image frame buffer 406. Various adaptive thresholding techniques may be employed to account for variations in lighting conditions encountered by the system. When the vehicular platform is not moving, it is assumed that a significant area of the image frame will appear unchanged across multiple sequentially acquired image frames. If it is determined in step 408 that the platform is moving, then control jumps to step 402, causing the traffic monitoring state to be reset.

Otherwise, if it is determined in step 408 that the platform is not moving, then control passes to step 409, wherein the most recent image frame in the image frame buffer 406 is analyzed to determine whether or not an object is obstructing the view of the road within distance d of the front of the vehicular platform on which the invention device 301 is installed. In the preferred embodiment, d=10 meters. One ordinarily skilled in the art will be able to use an edge detection image to locate the curb or lane markings and estimate the range by comparing the width of the present lane of travel in image space to the instantaneous field of view of the camera and the known physical width of the lane of travel. Leveraging existing algorithms for blob or object detection, one with ordinary skill in the art can then estimate the range to the nearest object in the present lane of travel and subsequently judge whether or not the road ahead is obstructed by an object within distance d. While this method may employ many assumptions about the geometry of the vehicle on which the present invention is installed, as well as roadway and lane geometry, it can usually be assumed that the curvature of the road is negligible over distances less than d. If in step 409 it is determined that an object is obstructing forward motion of the platform, then control proceeds to step 410; otherwise control passes to step 412.

In step 410, it is determined whether or not the obstructing object was also present in the previous image frame and if so, whether the object was positioned in the same location within the image frame. One with ordinary skill in the art will be able to use any one of a number of techniques to estimate the location of the object within an image frame. Acceptable methods include but are not limited to 1) centroid estimation of a detected object; 2) computing the minimum bounding rectangle for the detected object; and 3) extraction and correspondence of geometric or texture features on the detected object. The technique employed will depend on the amount of processing power available in the device controller 303. If the object is observed in the same location of the previous image frame as it does in the current image frame, then control proceeds to step 411; otherwise control passes to step 413.

In step 411, an object persistence counter that is part of the traffic monitoring state is incremented. The purpose of this step is to inform the process as to the number of sequential usable frames for which the vehicular platform is stopped behind another stationary vehicle. Upon completion of step 411, control jumps back to step 403.

In step 413, the persistence counter is tested to determine if the vehicle on which the present invention is installed has been stopped in traffic behind another vehicle for a sufficient period of time to assume that the operator of the vehicle may have withdrawn attention from the road. A threshold value m is selected for this purpose. This value must be a positive integer greater than 1 and may be adjusted according to the driver's preference via the MDCS 311. In the preferred embodiment, the default value of m is 5. If the persistence counter is less than m, then control proceeds to step 418; otherwise, control passes to step 414.

In step 414, an alert signal is transmitted from the invention device to the DHMCD. In the preferred embodiment, this occurs via the Bluetooth Message Access Profile specification, for which one having ordinary skill in the art will be able to readily implement application-level support on their mobile device platform of choice. The alert signal may be presented to the operator according to their preference. Upon completion of step 414, control jumps back to step 402.

In step 418, the state of a traffic signal is tested. If the state is empty, it means that since the last reset of the traffic monitoring state, no traffic light has been detected and interpreted. In this case, control jumps back to step 402. Otherwise, if the traffic signal state is not empty, it means that an object has just appeared in a position between the traffic signal and the vehicle on which the invention device is installed. In this case, control proceeds to step 419.

In step 419, the traffic signal state is preserved but the object persistence counter is reset to enable continuity of traffic signal monitoring. Upon completion of step 419, control jumps back to step 403.

In step 412, the object persistence counter is compared to m. If the object persistence counter is greater than m, then control passes to step 414; otherwise control proceeds to step 415 wherein the image frame is analyzed for the presence of an illuminated traffic signal. In the preferred embodiment, three colors of illuminated traffic lights can be detected on an illuminated traffic signal: red, yellow, and green. Possible geometries of these signals include circles, directional arrows, and U-turn arrows for the preferred embodiment. Detection of a traffic signal in the preferred embodiment searches for an illuminated traffic signal a rectangular region of interest (ROI) vertically spanning a region of the image corresponding to the top 15 degrees of field of view and horizontally spanning a region of the image frame corresponding to ±10 degrees about the optical axis. This ROI is first tested for circular regions matching one of the allowed colors, since circular traffic signals represent the most common geometry for illuminated signals. When no illuminated traffic signal with a circular geometry is detected, then template matching is used to detect the other possible geometries in the following order in the preferred embodiment: left arrow, up arrow, right arrow, left U-turn. If no matching geometry is found, then the preferred embodiment resorts to a simple blob detector constraining the minimum number of pixels to 4 and the maximum number of pixels to 400 with a maximum aspect ratio of 2 and a minimum aspect ratio of 0.5. One with ordinary skill in the art of image processing will be able to readily implement the preferred embodiment for traffic light detection and classification, but there are many other viable implementations that could be employed with greater sophistication to achieve more robust performance, depending upon the chosen hardware architecture. If an illuminated traffic signal is detected in the present lane of travel, then the geometry and color of the traffic signal is saved as the traffic signal state in step 416. For the corresponding frame being analyzed. It is important to note that the traffic signal state refers to a collection of representations of the traffic signals detected for each frame. An empty traffic signal state means that there is no traffic signal state recorded for any of the image frames in the image frame buffer 406.

In step 417, the saved traffic signal state is analyzed to determine if one or more illuminated traffic signals governing the present lane of travel has just transitioned to a green signal from any other color of signal or from an empty state, as is the case when an image frame is acquired between successive color signal illuminations or as would occur in the case where the traffic signal is an illuminated LED matrix controlled by a display scanning frequency. If an illuminated traffic signal transitioned to green, then control is passed to step 414; otherwise, control resumes at step 419.

Referring now to the comprehensive tabulation of all possible logical paths through the main event loop of the IDCS in FIG. 5, each row of the table corresponds to a distinct case 501 through 511. Whereas the previous detailed description of the FIG. 4 served to explain the preferred embodiment and purpose of each step of the main event loop of the IDCS, the following description of FIG. 5 serves to explain the functional purpose of each path that can be followed through decision gates in steps 405, 407, 408, 409, 410, 412, 413, 415, 417, and 418. In total, there are only eleven possible paths that can be realized through these ten decision gates. In FIG. 5, dedicated decision columns labeled 405, 407, 408, 409, 410, 412, 413, 415, 417, and 418, correspond to the steps in FIG. 4 with the same numeric labels. Each row in the table of FIG. 5 represents an independent case, and the corresponding cell of the table located at the intersection of a row and column indicates the logical output of the decision gate of that particular column and the case of that particular row. The logical output values "Yes" and "No" correspond to the decision branches emerging from the corresponding decision gate step in FIG. 4 labeled the same. A logical output value of "-" is given for combinations of cases and decision gates that are logically unreachable. FIG. 5 also provides a column with an abbreviated description of the expected result from the execution of the main loop in the IDCS for each case.

Case 501 represents the most frequently occurring case encountered whenever the event loop is executed while the present invention is installed on a vehicle that is moving through normal traffic conditions.

Case 502 pertains to when the vehicle on which the present invention is installed has been stopped in traffic behind another stopped vehicle for at least two consecutive usable image frames.

Case 503 pertains to when the vehicle on which the present invention is installed has been stopped in traffic behind another stopped vehicle for at least m consecutive usable image frames, but in the latest image frame, the other vehicle has moved to another position. Case 503 will result in an alert being wirelessly transmitted to the DHMCD indicate to the operator of the motor vehicle that traffic has resumed flowing.

Case 504 and case 505 both pertain to when the vehicle on which the present invention is installed is stopped behind another vehicle that is moving, and was also moving in the previously acquired image frame. The difference between these two cases is that in case 504, no illuminated traffic signal was visible in any of the m previous consecutively usable image frames, while in case 505, a traffic signal was visible in one or more of the m previous consecutively usable image frames. Case 505 pertains to situations such as when the vehicle on which the present invention is installed is positioned directly behind an illuminated traffic signal, but one or more vehicles are passing in front as part of the transverse flow of traffic. From FIG. 1 this case would apply to the present invention being installed on vehicle 107 where the latest image frame will be acquired a few moments into the future as vehicle 110 crosses the present lane of travel less than distance d in front of vehicle 107. Case 505 exists to account for situations where an obstruction in the present lane of travel is momentary in nature and should not result in a reset of the state of the traffic signal. It is appropriate, however to reset the persistent object counter in case 505.

Case 506 pertains to when the vehicle on which the present invention is installed had been stopped in traffic behind another vehicle for m consecutive usable frames, and where the vehicle on which the present invention is installed is still stopped, but where there is no longer another vehicle located within distance d in the present lane and intended direction of travel. Case 506 infrequently occurs and can result from a situation where a piece of debris, litter, or living organism momentarily adhered to the windshield before natural or unnatural forces cause such an obscuration to be removed so quickly that it appears in one usable frame and completely disappears from the next usable frame. Still a more infrequent situation that would lead to case 506 is when natural or unnatural forces of such severity and precision are sufficient to cause a stopped vehicle immediately in preceding the stopped vehicle on which the present invention is installed to be physically removed from the field of view of the camera sensor 302 between subsequent acquisitions of usable image frames. In case 506, the IDCS will send an alert to the DHMCD.

Case 507 pertains to a situation where the vehicle on which the present invention is installed is stopped at an illuminated traffic signal that has transitioned to a green illuminated signal since the last image frame was acquired. In case 507, the IDCS will send an alert to the DHMCD indicating that traffic flow should resume.

Case 508 pertains to a situation where the vehicle on which the present invention is installed is stopped at an illuminated traffic signal but that has not transitioned to green since the acquisition of the previous image frame.

Case 509 pertains to a situation where the vehicle on which the present invention is installed is stopped with no impeding traffic within a distance d of the vehicle in the present lane and direction of travel and with no detectable illuminated traffic signal in any of the past m usable image frames. Case 509 pertains to the period of delay after traffic resumes moving but the operator of the vehicle has not yet reacted by driving the vehicle forward. Case 509 also pertains to situations where the vehicle is parked on the side of a road or in a parking lot.

Case 510 pertains to a situation where the circular image frame buffer 406 is not yet full. This case only occurs when the system is first powered on and before the first n usable frames have been acquired and stored into the image frame buffer 406.

Case 511 pertains to any situation wherein the most recently acquired image frame is not usable. Case 511 most commonly pertains to situations where a windshield wiper or precipitation obstructs the field of view of the camera sensor 302 in a manner that would interfere with the processing of the image frame. In rare circumstances case 511 may apply when visibility is sufficiently low so as to cause the IDCS event loop to be unable to acquire any usable image frames for an extended period of time. In such conditions the present disclosure of invention assumes that it is unsafe to be operating a motor vehicle. A variant of the preferred embodiment of the present invention may optionally include a special case if needed to transmit a corresponding alert signal to the DHMDC as an additional precaution against unsafe use of the present invention due to poor visibility. Visibility may be limited by any of the following conditions: fog, precipitation, frost on the exterior of the windshield, or condensation on the interior of the windshield. There may be other circumstances that could limit visibility, but the aforementioned are assumed to be the most common.

In broad embodiment, the present invention is a method and device for providing wireless notifications to a driver via a mobile device indicating when a stopped traffic condition in the present lane of travel is about to resume flowing. The preferred embodiment offers a primary advantage by enabling a motor vehicle operator to have an affordable means of safely maximizing the utility of time spent at red lights and freeway traffic jams while traveling to and from a place of work, school, or other daily activity.

While the foregoing written description of the invention enables one of ordinary skill in the electrical engineering, image processing, machine vision, mobile platform development, and embedded platform development to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:

1. An on-vehicle apparatus, comprising:
   a single camera sensor for capturing a sequence of image frames usable for detecting and monitoring traffic conditions in the direction of travel of said vehicle;
   a means for processing which will determine from said sequence of image frames whether or not said vehicle is moving and whether or not said vehicle may be accelerated;
   a means for notification which will alert the operator of said vehicle when said vehicle may be accelerated from a complete stop;
   wherein said apparatus operates autonomously without necessitating user input;
   wherein said apparatus is a physically separate and distinct device capable of sending wireless notifications to a handheld mobile device in possession of said operator
   wherein said apparatus is electrically isolated from control and sensory signals already equipped on said vehicle;
   wherein said apparatus receives electrical power from said vehicle;
   wherein said vehicle is immediately preceded by another vehicle or said vehicle is stopped at a traffic signal with no preceding vehicle;
   whereby the operator of said vehicle can safely divert attention from traffic conditions while said vehicle is stopped in traffic;
   whereby the apparatus offers key benefits of compatibility, low cost of manufacture, ease of installation, and portability.

2. The on-vehicle apparatus according to claim 1 wherein a wireless radio transceiver is used to support said means for notification; whereby notification may be presented on a separate notification device disposed in a location more preferable to the operator of said vehicle.

3. The on-vehicle apparatus according to claim 2 wherein one or more Bluetooth® Low Energy communication protocols support said means of notification; whereby said on-vehicle apparatus may benefit from secure and standard communications protocols intended for communications across ranges less than ten meters.

4. The on-vehicle apparatus according to claim 2 wherein said operator receives notification on a handheld mobile communication device of said operator; whereby said on-vehicle apparatus improves safe vehicle operation of said operator and to limit further disruption of traffic flow resulting from said operator being distracted while using said handheld mobile communications device.

* * * * *